United States Patent [19]
Doiron

[11] Patent Number: 5,968,197
[45] Date of Patent: Oct. 19, 1999

[54] METHOD AND APPARATUS FOR DATA RECOVERY

[75] Inventor: Timothy J. Doiron, Forest, Va.

[73] Assignee: Ericsson Inc., Research Triangle Park, N.C.

[21] Appl. No.: 08/626,008

[22] Filed: Apr. 1, 1996

[51] Int. Cl.[6] .............................. G08C 25/02; H04L 1/18; G06F 11/08
[52] U.S. Cl. ............................................ 714/748; 714/797
[58] Field of Search .................................. 371/32, 35, 36, 371/37.01, 37.9, 38.1, 42, 43.5, 62, 67.1, 69.1; 340/311, 825.44; 375/340, 342, 347, 354

[56] References Cited

U.S. PATENT DOCUMENTS

| | | | |
|---|---|---|---|
| 3,662,338 | 5/1972 | Cain, III | 371/43.5 |
| 4,128,809 | 12/1978 | Kage | 375/347 |
| 4,132,975 | 1/1979 | Koike | 371/36 |
| 4,375,102 | 2/1983 | Van Daal | 375/340 |
| 4,471,485 | 9/1984 | Prevot et al. | 371/35 |
| 4,956,641 | 9/1990 | Matai et al. | 340/825.44 |
| 5,241,548 | 8/1993 | Dillon et al. | 371/69.1 |
| 5,321,703 | 6/1994 | Weng | 371/36 |
| 5,404,374 | 4/1995 | Mullins et al. | 371/70 |
| 5,426,653 | 6/1995 | Hayes et al. | 371/36 |
| 5,463,646 | 10/1995 | Dillon et al. | 371/69.1 |
| 5,745,502 | 4/1998 | Khayrallah et al. | 371/35 |
| 5,870,406 | 2/1999 | Ramesh et al. | 714/709 |

FOREIGN PATENT DOCUMENTS

93/06671   4/1993   WIPO .

*Primary Examiner*—Emmanuel L. Moise
*Attorney, Agent, or Firm*—Nixon & Vanderhye P.C.

[57] ABSTRACT

The present invention recovers data utilizing information from previously received data packets to reconstruct a data packet with an ever increasing probability of reconstructing the actually transmitted data packet. With each new reception, the accumulated information brings the receiver closer to obtaining the actually transmitted data packet. This use of information which might otherwise be discarded permits highly efficient and effective bit error correction particularly useful in hostile communications environments by transceivers with limited data processing and/or memory resources.

31 Claims, 8 Drawing Sheets

METHOD AND APPARATUS FOR DATA RECOVERY

FIELD OF THE INVENTION

The present invention relates generally to the field of data processing and communications, and in particular, to the recovery of data transmitted over a communications channel or retrieved from memory.

BACKGROUND AND SUMMARY OF THE INVENTION

In digital data systems, it is common for data stored in memory as well as data transmitted over a communications channel to be corrupted by errors. There are numerous techniques typically employed to detect errors and/or correct detected errors. One example of an error detection technique is the well known cyclic redundancy code (CRC) check. Other techniques that use block codes and convolutional codes permit both error detection and error correction. For error detection and correction, additional coding bits are added to the data bits. When the data is received over the communications channel or retrieved from memory, the received/retrieved data are decoded using the additional bits in some fashion to detect if some of the data are in error. One way of thinking of these decoding procedures is to analogize them to a human's ability to correct spelling errors while reading printed text. Because words are sufficiently different from each other, the reader intuitively knows which word is meant.

These error detection and/or correction coding techniques all add, to some degree, redundant information. The more redundancy built into a unit of data, the more likely that errors can be accurately detected, and in some instances, corrected. Unfortunately, as the number of coding/redundant bits increases, the overall data "throughput" decreases. In other words, the actual data content transmitted per unit time is reduced. Additionally, as the number of coding/redundancy bits increases, the complexity of the encoding/decoding algorithms increases which consumes limited data processing resources and slows down data processing time.

In some relatively "clean" environments where data are unlikely to be corrupted, fewer coding/redundancy bits can be used in conjunction with simpler error detection and/or correction procedures. However, in hostile environments where there is considerable noise, interference, etc., such simplification is usually not an option. Consider for example a radio/wireless communications environment. The radio frequency communications channel is subjected to a barrage of corrupting factors including ever present noise, nearly continuously changing communications channel characteristics, multipath fading, time dispersion which causes intersymbol interference (ISI), interference from adjacent channel communications, and a host of other factors.

One communications protocol (i.e., procedure) used to protect against these various corrupting factors is automatic repeat request (ARQ) transaction processing. A pure ARQ system employs only error detection—error correction is not used. More specifically, data packets having some type of error detection bits/coding are transmitted from a sender to a receiver over a communications channel. Each received data packet is processed by the receiver using the error detection bits included in the data packet to determine if the data packet was received correctly. If the packet was safely and accurately received, the receiver transmits an acknowledgment signal (ACK) back to the sender. If errors are detected, the receiver sends a negative acknowledgment (NAK) back to the sender, discards the data packet, and waits for a retransmission of that same data packet from the sender. In addition, a predetermined timing window is set to allow the sender sufficient time to transmit information, the receiver to receive and process the information, and then transmit an ACK or NAK signal to the sender. If the sender does not receive an ACK signal within that predetermined window or if it receives a NAK signal during the window, the sender retransmits the data packet.

In a noisy or otherwise data corrupting environment like wireless communications, a large number of retransmissions may occur before data is correctly received. Significantly, no matter how many times a data packet is transmitted/retransmitted, the receiver does not become any "smarter" about how to decode the correct information from a later retransmitted data packet In other words, the probability of receiving the packet correctly on any given data packet retransmission is no better than the probability of the previous retransmission of that packet.

One possible option for improving this ARQ protocol is to add forward error correction (FEC) bits to the data packet to permit some degree of bit correction. An example of such a "hybrid" technique would be to replace CRC error detection bits with Bose-Chaudhuri-Hocquenghem (BCH) parity check bits. If erroneous bits could be corrected by the receiver, an acknowledgment could be sent to the transmitter without the need for further retransmission. Even using such a hybrid technique where a limited number of error patterns can be corrected, such a hybrid technique (like the pure ARQ protocol) does not make use of the information contained in the previously received packets. Erroneous data packets in the pure ARQ protocol or data packets having errors uncorrectable using the hybrid technique are simply discarded requiring a continuing sequence of retransmissions.

What is needed is a data recovery technique applicable for example to ARQ protocols which makes use of information contained in previously transmitted packets, i.e., using erroneous data packets rather than discarding them, so that the currently received retransmission of the data packet can be corrected using that information from the previously received data packets. Many of the bits of the earlier transmitted packets are likely to be correct, and only one or a few of the bits in most instances are corrupted. A main objective of this invention is to utilize the correct information accumulated from prior transmissions of the packet to generate a correct data packet. Such a technique should not, however, consume too much processing time and should minimize, if possible, the amount of memory required for such processing so that the technique can be used in various environments where memory resources are limited, e.g., portable/mobile radios. It would be desirable therefore to have forward error correction in an ARQ protocol without requiring the addition of forward error correction bits to each data packet.

It is an object of the present invention to provide a data recovery system in which a correct data unit is recovered using information contained in previously received/transmitted but unacceptable data units.

It is an object of the present invention to provide such a data recovery technique in an automatic repeat request (ARQ) transaction environment so that data can be corrected without having to add additional forward error correction bits to the data units.

It is a further object of the invention to provide an error recovery technique which is effective in recovering data in a hostile environment without requiring the addition of forward error correction bits to the data packet, complex forward error data correction decoding procedures, or significant memory resources.

The present invention solves the various problems noted above and meets these and other objectives. In an automatic repeat request data transmission system where data units are received, checked for errors, and retransmitted if errors are detected such that a set of data units is generated, the present invention performs a first reconstruction operation on alternate data units in the sequence and a second reconstruction operation on the other data units in the sequence in order to reconstruct an acceptable data unit. One of the reconstruction operations may include determining a majority voted data unit based on a currently received data unit and previously received data units in the sequence. The other reconstruction operation may perform a direct comparison of the majority voted data to a currently received data unit to identify those bit positions which have different bit values. One or more bit values at those bit positions are changed in the hope of generating a correct data unit. This alternate application of voting and packet comparison reconstruction techniques to a pure automatic repeat request (ARQ) environment (i.e., one without forward error correction) is very significant because a communication unit can significantly improve its performance in high bit error rate environments and increase the probability of correctly receiving a transmitted packet in shorter time periods.

In the preferred example embodiment using alternate majority vote and packet comparison data unit reconstruction techniques, majority voting is less effective when there are an even number of packets in the vote in the sense that it is difficult to resolve "tie" votes. For example, if there are four packets being voted, what value should be assigned to a bit position where two of the packets have "1's" for that bit position and the other two packets have "0's" for that bit position? Rather than arbitrarily selecting a "1" or "0", the preferred example embodiment of the present invention uses a majority vote only for odd numbers of received data packets and direct comparison of the currently received data packet to the majority voted data packet for evenly numbered packets to avoid this tie-breaking dilemma. In both the majority vote and direct comparison techniques, information from previously received data packets is used which increases the likelihood of obtaining a correct packet.

Because the majority vote and direct comparison operations are relatively simple to perform, relatively small amounts of data processing resources and time are consumed. Moreover, the present invention provides a novel technique of making use of information contained in previously received but nonetheless erroneous packets with minimal memory. While the information from previously received erroneous packets is preserved, the packets themselves are not stored. Instead, the present invention accumulates for each corresponding bit position in the reconstructed data packet a sum of bits in that bit position from each received data unit. A threshold is then determined based on the number of retransmitted data units in the sequence, and each accumulated sum is compared to the threshold. If the accumulated sum is less than or equal to the threshold, the bit value for the corresponding bit position of the reconstructed data packet is set to 0. Otherwise, the bit value for the corresponding bit position of the reconstructed data packet is set to 1.

BRIEF DESCRIPTION OF THE DRAWINGS

These and other objects of the present invention as well as specific example embodiments of the invention will now be described in conjunction with the following drawings in which like reference numerals refer to like elements.

DETAILED DESCRIPTION OF THE PREFERRED EXAMPLE EMBODIMENTS

In the following description, for purposes of explanation and not limitation, specific details are set forth, such as particular circuits, interfaces, techniques, etc. in order to provide a thorough understanding of the present invention. However, it will be apparent to one skilled in the art that the present invention may be practiced in other embodiments that depart from the specific details. In other instances, detailed descriptions of well known methods, devices, and circuits, are omitted so as not to obscure the description of the present invention with unnecessary detail.

The present invention is described for purposes of example only in the context of a data communication system. Subsequent embodiments describe application of the present invention to a radio communications environment in particular. However, the present invention is not limited to radio communications or any type of data communications for that matter. Other applications of the present invention may be to any kind of data processing system which must receive and/or access data which has the possibility of being corrupted including for example various data being transferred to or from a storage device.

Figure 1:
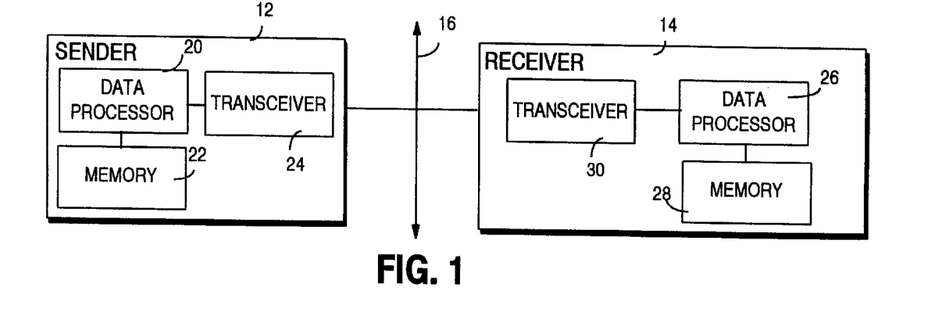
FIG. 1 is a function block diagram of a data communications system according to one example embodiment of the present invention.

Accordingly, FIG. 1 describes a wireline type data communications network which includes a sender 12 such as a data processor 20 which sends packets of data over a network bus 16 to a data receiver 14 which may be another data processor or some other device, e.g., a peripheral. Both data processors 24 and 26 have their respective memories 22 and 28 and both data processors include respective transceivers 24 and 30 for communicating packet information over the network bus 16. Data processor 20 and transceiver 24 format data to follow the appropriate protocol used for transmission over the network bus 16 including dividing of data into data units or data packets as well as the inclusion/ encoding of error detection bits. Data processor 26 processes the data units received in transceiver 30 in accordance with algorithms stored in memory 28 in order to detect whether each data unit is correctly received. In one particularly advantageous application of the present invention, an automatic repeat request (ARQ) protocol is employed between sender and receiver so that when a data unit is received correctly by receiver 14, the receiver 14 transmits an acknowledgment (ACK) back to sender 12 over the network bus 16. If the data unit is received incorrectly and cannot be correctly reconstructed in accordance with the present invention, receiver 14 transmits a negative acknowledgment (NAK) over the network 16 to sender 12 which in response retransmits that same data unit.

Figure 2:
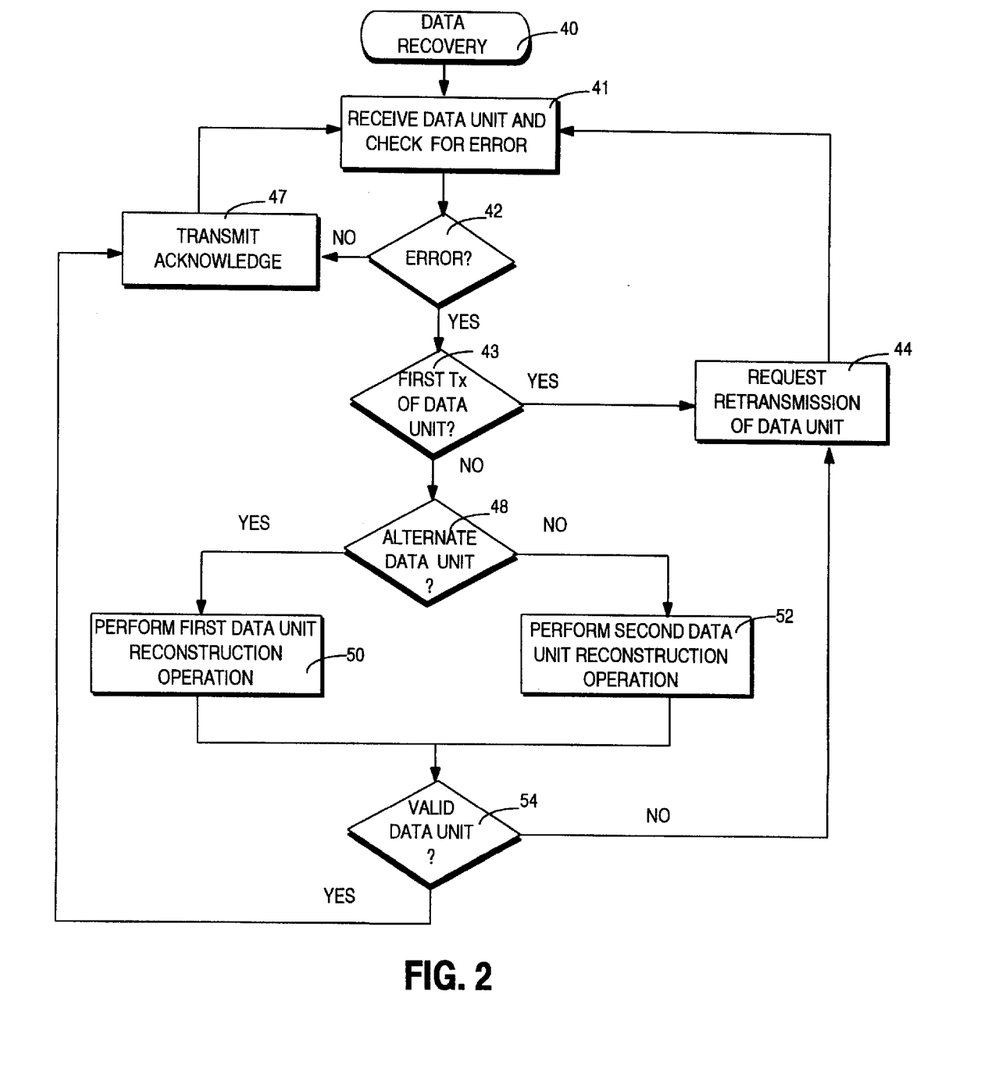
FIG. 2 is a flowchart diagram illustrating a method in accordance with one example embodiment of the present invention.

The data recovery technique used by the receiver data processor 26 in order to accurately recover a data unit from a sequence of retransmitted versions of that data unit is now described in FIG. 2. Although the sequence of data units is described hereinbelow in the context of retransmissions over a communications channel (wire or wireless), the sequence of data units could also be generated by multiple accesses from a data storage device of the same data unit. The number of retransmissions or accesses is of course a design parameter in any system. A higher number of retransmissions or accesses might be set in a more error prone system, while a lower limit might be set in a relatively error free system/ environment.

In the data recovery procedure 40, a data unit is received and checked for errors (block 41). If the current data unit is received without error (or alternatively within an acceptable bit error rate for applications such as digital voice which can tolerate some bit errors), an acknowledgment (ACK) is transmitted back from the receiver 14 to the sender 12 (block 47), and the next received data unit is checked for errors (block 41). Otherwise, a decision is made whether this is the first transmission of the data unit (block 43). If it is, the receiver 14 requests retransmission of the data unit (block 44) and returns to receive the retransmitted data unit and check for errors (block 41).

If this is a retransmission of the data unit, a decision is made whether this data unit is an "alternate" data unit (block 48). As one example, alternate data units may correspond to the "odd" transmissions of the same data unit, i.e., transmission 1, retransmission 3, retransmission 5, etc. On the other hand, alternate data units may correspond to "even" transmissions, i.e., retransmission 2, retransmission 4, retransmission 6, etc. If the data unit is an alternate data unit, a first data unit reconstruction operation is performed (block 50). Otherwise, a second data unit reconstruction operation is performed in (block 52).

After either one of the first or second data unit reconstruction operations is performed, a decision is made in block 54 whether the reconstructed data unit is valid, e.g., whether the reconstructed data unit is free of bit errors or is below a predetermined bit error threshold. If so, control returns to block 47 where the receiver 14 transmits an acknowledgment back to the sender 12. Otherwise, control returns to block 44 to request retransmission of the data unit.

Figure 3A:
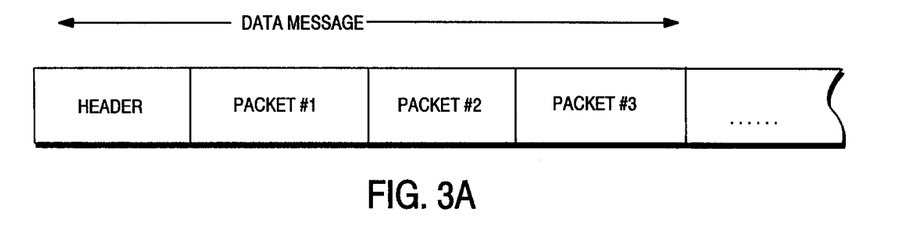
FIGS. 3A–3C illustrate example data messages and data packets contained within the data message.

The present invention may be applied to any data format where data is sent in units. For example, FIG. 3A shows one example format for a digital data message. The message may begin with a header portion of bits allocated to any number of functions including start of a data message, sender and/or receiver address information, length of the message, etc. One example of such a header is the standard Internet protocol (IP) header. The header is followed by packets of data shown in FIG. 3A as packet number 1, packet number 2, packet number 3. . . .

Figure 3B:
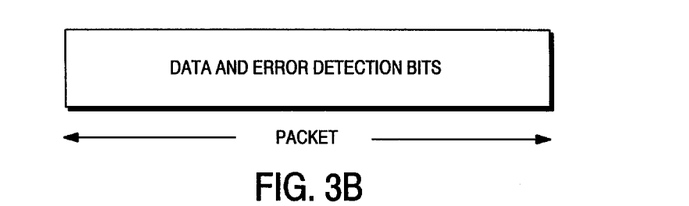

Each packet as shown in FIG. 3B includes both data and error detection bits. In other words, not all bits in each packet correspond to the substantive information to be transmitted. It will be appreciated that while the term data packet is sometimes used in the present invention, the present invention may be applied to any unit of data and is not necessarily limited to data packets.

Figure 3C:
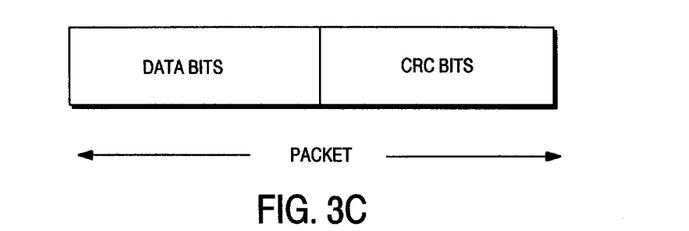

One specific example configuration of a data packet is shown in FIG. 3C. A predetermined number of data bits in a first portion of the data packet is followed by a second portion of cyclic redundancy check (CRC) bits. A cyclic redundancy check provides only error detection—it is not used to correct errors. Examples of well known CRCs include CRC-CITT and CRC-16. The present invention may also be applied with forward error detection and correction bits such as BCH parity check bits. However, one of the advantages of the present invention is that forward error correction bits and encoding/decoding algorithms do not need to be employed in data recovery.

Figure 4:
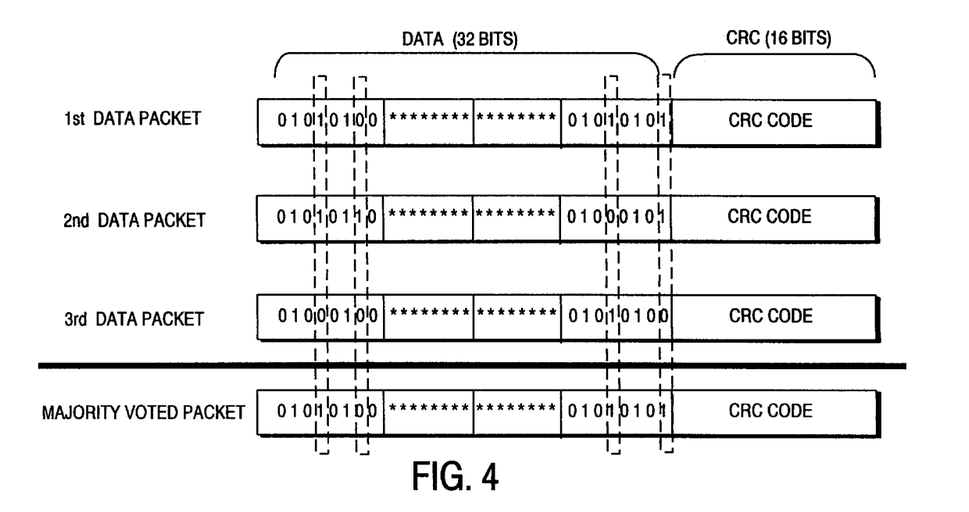
FIG. 4 illustrates a majority voted packet.

One of the first and second data unit reconstruction operations may be a majority voting operation described now in conjunction with the example illustration of FIG. 4. In a preferred embodiment, the majority voting technique is applied to alternating, odd data packet transmissions. Therefore, in the simple example shown in FIG. 4, the majority vote operation is performed on three transmissions of the data packet. Each data packet may include in this non-limiting example 32 data bits and 16 CRC bits. If two or three of the bits in one particular bit location have the same value, that value is assigned to that bit position in the majority voted data packet. The two examples in the first 8-bit byte of the three data packets show that in the fourth bit position a majority vote of 1, 1, and 0 results in a 1. In contrast, in the seventh bit position, a majority vote of bit values 0, 1, and 0 results in a 0 assigned to that seventh bit position. Although not illustrated, any portion of bits of the data packet could be used to perform the majority voting operation. However, more information is achieved by performing the majority vote across the entire data packet including all 32 data bits and all 16 CRC bits.

The majority voted packet combines into a single data packet the cumulative bit information from the first, second, and third data packets. Many of these bits, as shown in FIG. 4, are accurately received (all 0's or all 1's in a particular bit position). Even in those bit positions that require a majority vote decision between differing bit values, there is a high probability that the majority vote result corresponds to the correct bit value. After generating the majority voted packet, the CRC operation is performed on the data packet to determine if it is correct or within acceptable tolerance.

Figure 5:
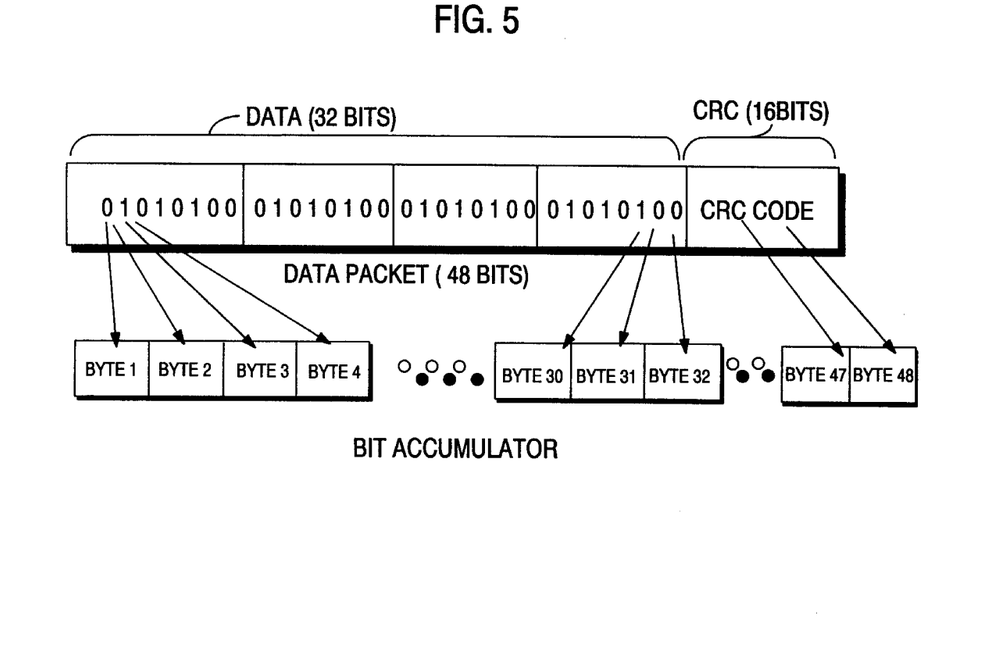
FIG. 5 illustrates a bit accumulation function in accordance with one example embodiment of the present invention.

A particularly advantageous but non-limiting implementation of the present invention is the use of a novel bit accumulation feature used in the majority vote determination process. Rather than storing each received data packet in memory and then retrieving each of these stored data packets for majority voting operation, memory is saved and complexity is reduced by generating and maintaining bit accumulators for each bit position in the data packet. Each bit of the received data packet is added to a corresponding bit accumulator. Thus, if there are 48 bits in each data packet, the data packet would have 48-bit accumulators, with the size of each accumulator being 1-byte. A bit value of "1" results in a "1" being added to the bit accumulator for that bit position, and a bit value of "0" results in no change to the corresponding bit accumulator value. In this way, a running sum of the total number of "1's" in each bit position of the data packet is maintained. The total sum value in each bit accumulator is compared to the number of received data packets. If the total sum value of the bit accumulator exceeds a threshold, the majority voted bit is set to "1"; otherwise, the majority vote bit is set to "0". The threshold may be set to equal half the number of received packets.

Such a bit accumulator is particularly advantageous in environments where a large number of packet retransmissions may be required. For example, if a total number of 255 packets retransmissions are permitted, each bit accumulator can be defined as a single, 8-bit (i.e., one byte) field. In other words, each byte is a single data packet accumulator. Using this configuration, a data packet having 16 data bytes and 2 CRC bytes will require 144 bit accumulators (i.e., a 144 bytes) corresponding to as many as 255 data packet retransmissions. This provides a significant savings in RAM as compared to storing each packet retransmission individually in RAM. If the packet had been sent 255 times, storing each packet individually would have required 255×18 bytes=4,590 bytes of RAM. With the bit accumulator method used in the present invention, only 144 bytes are required for a considerable savings in memory. Another configuration would be to permit only 15 total data packet retransmissions and use a 4 bit (nibble) bit accumulator field. This configuration permits a single byte of RAM to support 2 bit accumulators.

In the case of odd data packet receptions, the bit values at each bit position of the received data packet are added to the corresponding bit accumulators to create a new, majority-voted data packet. This new majority voted data packet is then processed using the CRC algorithm. If it passes CRC verification, the majority voted data packet is accepted, and an acknowledgment is generated to the transmitter indicating proper packet reception. If the majority voted packet is still in error, a negative acknowledgment is transmitted to the sender so that the packet may be retransmitted.

While the majority vote could be applied to even numbered packet receptions, this technique is not as effective because of the presence of potential "ties," e.g., four packets are received with two "1's" and two "0's" in a single bit position. Instead, in the preferred example embodiment of the present invention, an even data packet (received with unacceptable error) is directly compared with the majority voted data packet calculated in the previous odd data packet reception. The data packet bit values of the even data packet are added to the data packet bit accumulators as described above. However, a majority vote itself is not performed so that the majority voted packet (with which direct comparison is made) remains the same as calculated on the previous odd data packet reception.

Figure 6:
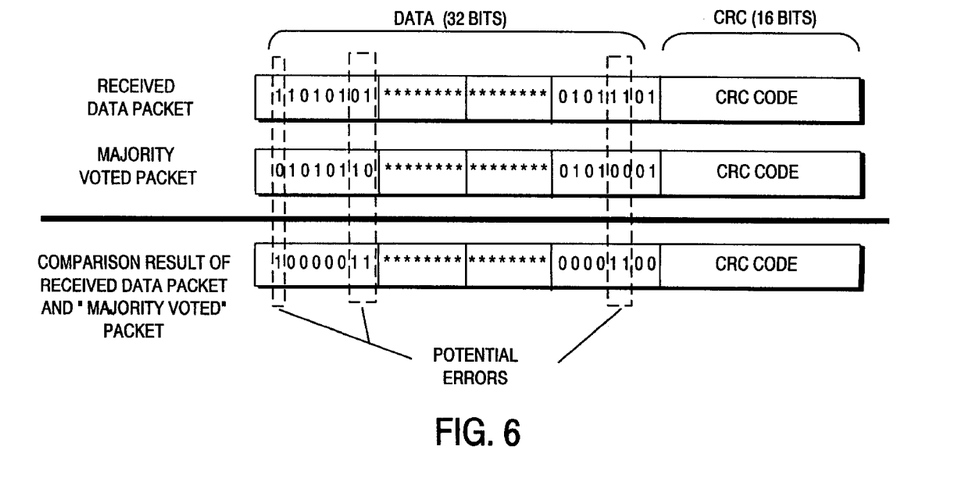
FIG. 6 illustrates a direct comparison of a received data packet with the majority voted packet.

An example of the direct comparison data unit reconstruction technique is illustrated in FIG. 6. Direct comparison is implemented for example using an exclusive-OR (XOR) operation where bits that are different between the two compared data packets result in a binary "1", and bits that are the same result in a binary "0". As with majority voting, direct comparison can be performed on a portion of the bits in the data packet, or preferably, on all the data bits in the packet. To implement the latter for example, all data and CRC bits of the illustrated received data packet would be compared with all data and CRC bits of the majority voted data packet.

If the number of bit differences exceeds a threshold, then it may for reasons described below, be prudent to discard the packet and send a negative acknowledgment to the sender. However, if the packets differ at only a few bit locations, then those differing bits are systematically set to all possible combinations with the CRC algorithm being run for each possible combination to check the accuracy of the data. In other words, if one of the differing bit locations is currently set to "1", it is changed to "0", and the CRC algorithm is checked. If two bit locations differ, then four possible different bit combinations are tried. For three bit locations, 8 possible bit combinations are tried and so forth. Thus, the number of possible bit combinations equals $2^{bitdifs}$ where "bitdifs" equals the number of differing bits. If any one of these bit combinations produces a valid CRC check, then an acknowledgment is generated by the receiver, and the corrected packet is accepted. If no valid packet is recovered, then a negative acknowledgment is transmitted.

The process of alternating between the two data unit reconstruction techniques, e.g., between even and odd number of packet receptions, continues until the packet has either been positively acknowledged or until the maximum number of retries has been reached. In the example configuration described above using 8-bit accumulators, the maximum number of retries/retransmissions allowed is 255.

In defining the threshold of the direct comparison technique, there is a practical limitation on the number of bit differences which can be permitted. The first problem is the amount of processing time involved in calculating CRCs for all possible combinations. This processing time must be limited to ensure that the receiver provides some kind of positive acknowledgment/negative acknowledgment to the sender within a predetermined amount of time, e.g., a fraction of a second. If the receiver spends too much time attempting all possible bit combinations, this ACK/NAK transmission timing window could very well be exceeded. The second problem is one of accepting a packet as accurate that is not the one actually transmitted by the sender, i.e., "falsing." If the number of bit differences between the two packets is large, the probability of correcting the packet to an incorrect value that nonetheless passes CRC verification increases. Therefore, trade-offs for accepting more bit differences in the direct comparison technique are greater data processing time, increased power consumption, and higher probability of "falsing."

A significant feature of the present invention is that important information from erroneous data packets is not lost by discarding those packets if they are erroneous or uncorrectable. In contrast, the present invention preserves and uses this important information using both the majority voting and direct comparison error correction techniques.

Consider for example a two percent bit error rate (BER) environment where a data packet consists of 4 bytes of data and 2 bytes of CRC code bits for a total of 48 bits. In this environment, the probability is high (62%) that each transmission of that data packet will contain one or more errors. In the absence of the present invention, the probability of receiving any one transmission of a data packet without errors can be determined in accordance with the following equation:

$$P_{good\ packet} = (P_{correct\ bit})^{number\ of\ bits} \quad (1)$$

Accordingly, the probability of receiving any packet with one or more bit errors is then determined in accordance with the following:

$$P_{error\ packet} = 1 - (P_{correct\ bit})^{number\ of\ bits} \quad (2)$$

In this 2% bit error rate environment, the probability of a single bit being correctly received is 98% (i.e., $P_{correct\ bit}$=98%). However, if the total number of data bits in the packet is increased from 4 to 16 bytes (for a total of 144 bits), the probability of a packet containing an error becomes very high (94.5%). As a result, current technology which simply discards data packets with errors and hopes that the next transmission will arrive error free is unrealistic and ineffective. Without the benefit of the data recovery/reconstruction techniques according to the present invention, the probability of successfully receiving an acceptable data packet in two data transmissions is as follows:

$$P_{success} = P_{good\ packet} + (P_{error\ packet})(P_{good\ packet}) \quad (3)$$

In the 2% bit error environment with 48 bit packets, the probability of successfully receiving the packet in two attempts is 61.8% which is not particularly promising even in this relatively low bit error rate environment.

However, by adding the direct comparison on even numbered transmissions and majority voting on odd numbered transmissions in accordance with a preferred example embodiment of the present invention, the probability of correctly receiving a data packet transmitted multiple times is significantly improved. The following probability calculations for each of the two correction techniques helps quantify that improvement.

For the direct comparison technique assuming only 2 bit differences are permitted between packets, the probability of successfully decoding the packet transmitted just two times is determined in accordance with the following equations:

$$P_{with\ direct\ comparison\ added}^{success} = P_{good\ pkt} + (P_{error\ packet})(P_{good\ pkt}) + (P_{error\ pkt})(P_{error\ pkt})$$

$$(P_{1\text{-}bit\ pkt\ error})(P_{1\text{-}bit\ pkt\ error\ (not\ same\ as\ previous\ pkt)}) \quad (4)$$

where $$P_{1\text{-}bit\ pkt\ error} = 48\ (1-P_{correct\ bit})(P_{correct\ bit})^{num\ of\ bits-1} \quad (5)$$

and $$P_{1\text{-}bit\ pkt\ error\ (not\ same\ as\ previous\ pkt)} = 47(1-P_{correct\ bit})(P_{correct\ bit})^{num\ of\ bits-1} \quad (6)$$

The probability of correctly receiving a data packet when the direct comparison technique is included increases from approximately 62% to 67%. This increase is modest because the received packet and majority voted packet are only allowed to differ by 2 bits in this scenario. In other words, each of the two packets can only have one bit error and the single bit errors in the two packets must not be in the same location. However, if the number of allowed bit differences were expanded to include three or four bit differences, then the probability of successful reception increases significantly.

Adding majority voting above to the data recovery process improves the probability of correcting a packet which has been transmitted three times. Using the above formula for the probability of correctly receiving one packet transmission, the probability of receiving a packet with three transmissions without majority voting is as follows:

$$P_{success} = P_{good\ pkt} + (P_{error\ pkt})(P_{good\ pkt}) + (P_{error\ pkt})^2(P_{good\ pkt}) \quad (7)$$

In a 2% bit error rate environment with 48 bit data packets, $P_{success}$=78.4%. If majority voting is included, the probability of correctly receiving the packet over three transmissions is as follows:

$$P_{success} = P_{good\ pkt} + (P_{error\ pkt})(P_{good\ pkt}) + (P_{error\ pkt})^2(P_{good\ pkt}) + (P_{error\ pkt})^3(P_{good\ majority\ vote}) \quad (8)$$

where $$P_{good\ majority\ vote} = [3\ (P_{correct\ bit})^2(1-P_{correct\ bit}) + (P_{correct\ bit})^3]^{num\ of\ bits} \quad (9)$$

The probability of correctly receiving a packet using majority voting is 98.7%.

If both the direct comparison and majority voting techniques are added, the probability of correctly decoding the received 48 bit packet in a 2% bit error rate environment transmitted just three times is nearly 100%. Significantly, this increase in probability of correctly recovering a data packet is achieved with no additional forward error correction bits added to the data packets. The present invention instead educates the receiver making it "smarter" using valuable information of previously received data packets to correct currently received data packet. Moreover, the direct comparison and majority voting techniques require only minimal time, computational, and memory resources. Even in particularly noisy environments requiring more than three transmissions, the present invention comes closer and closer to properly recovering the transmitted data packet with each new reception.

One potential use for the present invention where data processing resources are limited, memory space needs to be conserved, and where the communications environment is typically hostile (higher bit error rates), is in the field of radio communications. One example of a communications system is the trunked radio repeater system 100 shown in FIG. 7. Trunked radio repeater system 100 is a "multi-site" system where site controller S1 receives a call from mobile radio and coverage area A1 requesting a channel to communicate with a specific callee or group of callees. The caller requests the channel by pressing the push-to-talk (PTT) button of his portable/mobile RF transceiver. This informs the site controller S1 via an inbound digital control message transmitted over the assigned RF control channel that an audio working channel is needed. The site controller S1 assigns a working channel to the caller and instructs the caller's radio unit to switch from the control channel to the assigned working channel. This assigned working channel supports communications within the area covered by the site.

Figure 7:
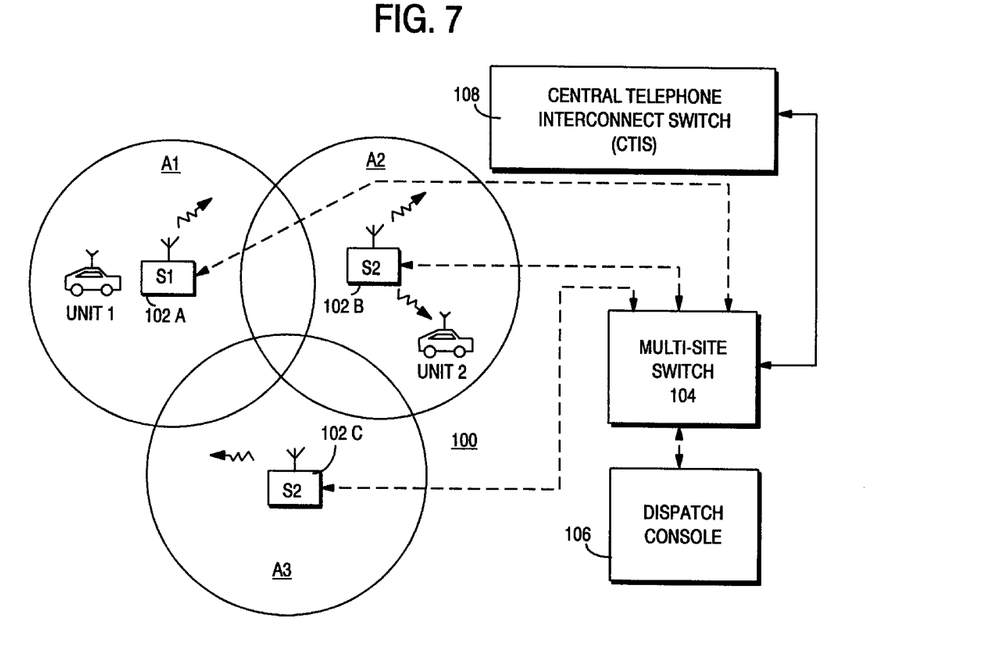
FIG. 7 is a schematic illustration of a multi-site, trunked radio communication system in which the present invention may have particular application.

In addition, the site controller may send a control message including the working channel assigned to a multi-site switch 104. The switch, in turn, sends a channel request to the other site controllers and routes audio signals such that an audio signal pathway is created between the RF site repeater servicing the caller and the RF site repeater(s) servicing the callee(s). In addition, audio signal pathways may also be established in similar fashion such that one or more dispatch consoles 106 and land line subscribers (via central telephone interconnect switch 108) may become involved in the communication. Upon receiving a channel request message, these secondary site controllers may each assign an RF working channel to the call (e.g., if a callee designated by the caller's channel request message happens to be physically located within the coverage area serviced by the associated RF transceiving site). Meanwhile multi-switch 200 ensures the caller's audio has been routed from the active RF receiver of site S1 to active transmitters of each of the other sites participating in the call. Further details are provided for example in U.S. Pat. No. 5,200,954.

Figure 8:
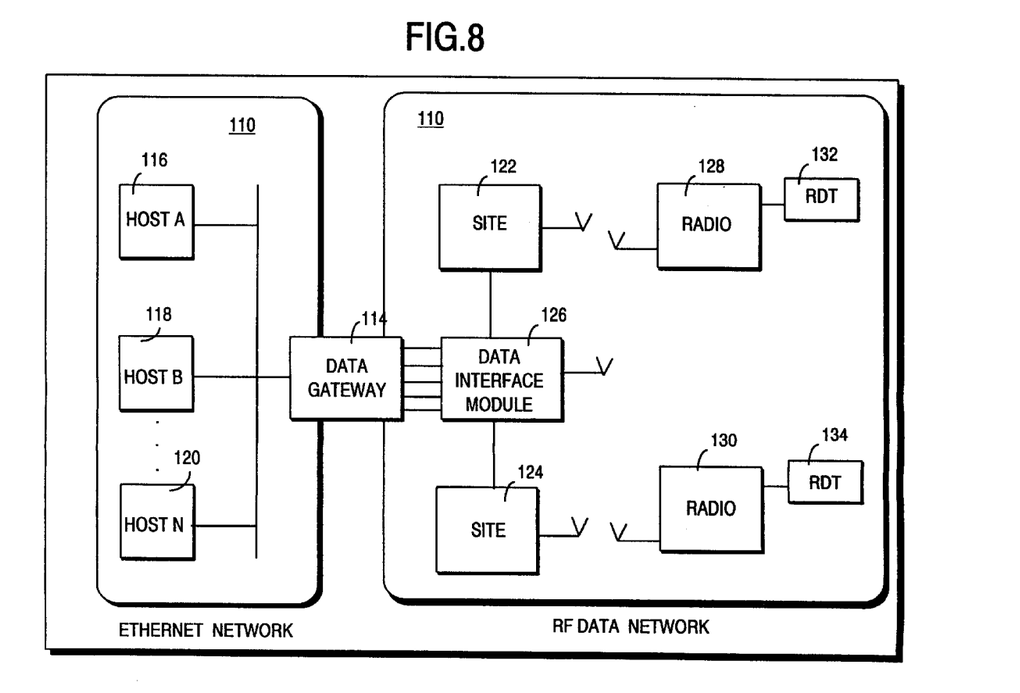
FIG. 8 is a function block diagram of a radio data network in which the present invention may be used.

Data communications can be performed using portable/mobile radio units over data networks. FIG. 8 for example shows two different types of networks including an Ethernet network 110 and a radio data network 112. The Ethernet network 110 and the radio network 112 are "internetworked" using a data gateway 114 and a data interface module 126. The data gateway 114 provides the interface for translating messages between both networks. Data gateway 114 connects to host computers 116, 118, and 120 on Ethernet network coaxial cable 114 using for example a standard protocol such as TCP/IP. In the RF data network 112, the data interface module 126 connects to a plurality of sites 122 and 124 which communicate over radio frequency communication channels with one or more radio units 128 and 130. Radio data terminals 132 and 134 (e.g., laptop PCs) may be connected to radios 128 and 130, respectively, to conduct data communications.

To effect a communication from radio data terminal 132 to host A 116, radio 128 informs site 122 over the RF control channel that it has a message and requests a RF working channel. Site 122 assigns an available RF working channel and informs the radio 128. The site 122 then sends a call assignment to the data interface module 126 which routes it on to the data gateway 114 to set up a data path between the data gateway and the RF working channel. The radio 128 breaks the message down into packets and sends packets on to site 122 over the RF working channel. The site 122 forwards the data packets to data gateway 114 via data interface module 126 as received. After the data gateway 114 receives a burst of message packets, it checks to see if they have been correctly received and sends one or more acknowledgment signals back to the radio over the RF working channel. If a data packet is not accurately received, a negative acknowledgment signal is transmitted to the radio and the radio retransmits another burst containing packets that the data gateway did not correctly receive. This continues until the data gateway 114 receives the entire message or until the radio exhausts its retry attempts. If the data gateway 114 successfully receives the data message, the data gateway 114 sends the message on to host computer 116 over bus 114.

Figure 9:
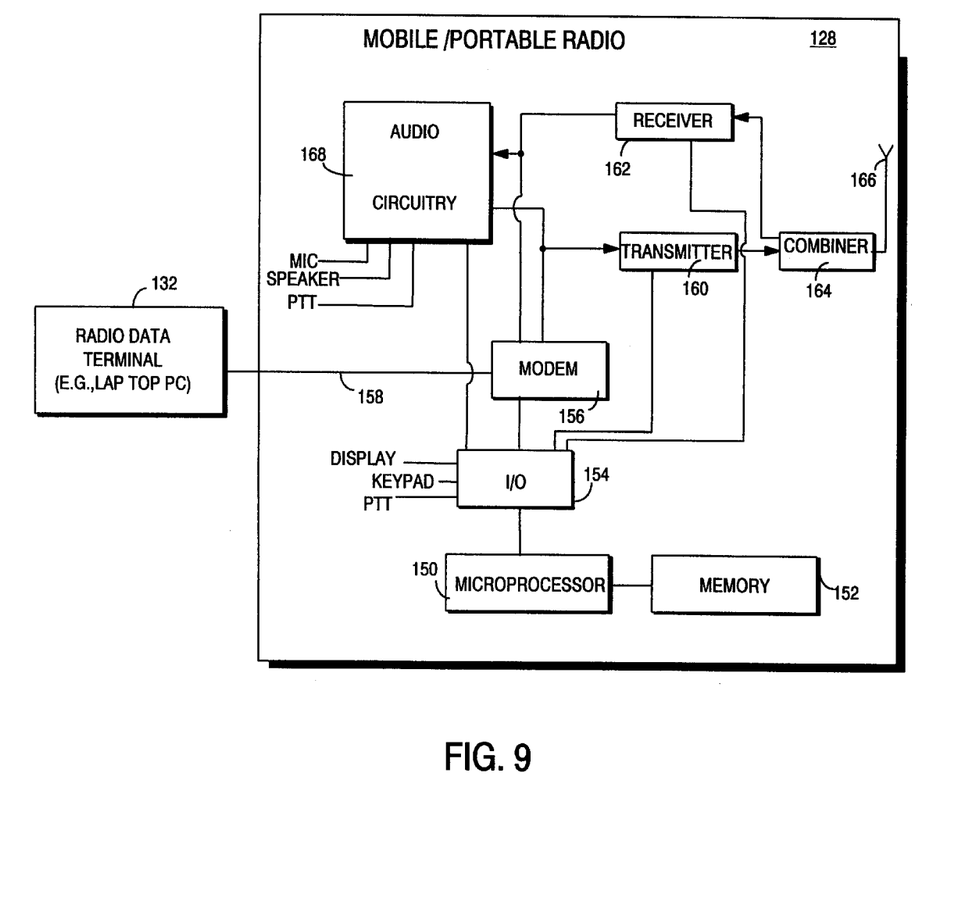
FIG. 9 is a function block diagram of a portable/mobile radio transceiver unit that may be used in accordance with the present invention.

The general architecture of a suitable mobile/portable radio unit for use in the present invention is microprocessor-based as depicted in FIG. 9. Microprocessor 150 is provided with suitable memory 152 and input/output (I/O) circuits 154 so as to interface with the radio display, keypad, push-to-talk (PTT) switch, as well as audio circuitry 168 which provides audio outputs to a speaker and accepts analog audio inputs from a microphone. A modem 156 functions as a digital interface to voice encryption, vehicle location, the multi-site switch, and other types of digital communication subsystems including the radio data terminal 132. It may be desirable in some instances to have the error detection algorithm such as a CRC check performed in hardware as opposed to software. If this is the case, the modem 156 may include hardware circuitry to perform error detection and/or correction functions in addition to modulation/demodulation functions. I/O circuitry 154 also permits suitable program control by microprocessor 150 of RF receiver 162 and transmitter 160 which, via conventional signal combiner 164, permit duplex communication over a common antenna 166 as will be appreciated by those skilled in the art. Radio data terminal 132 communicates with the radio 128 via RS-232 cable 158 connected to modem 156.

Figure 10:
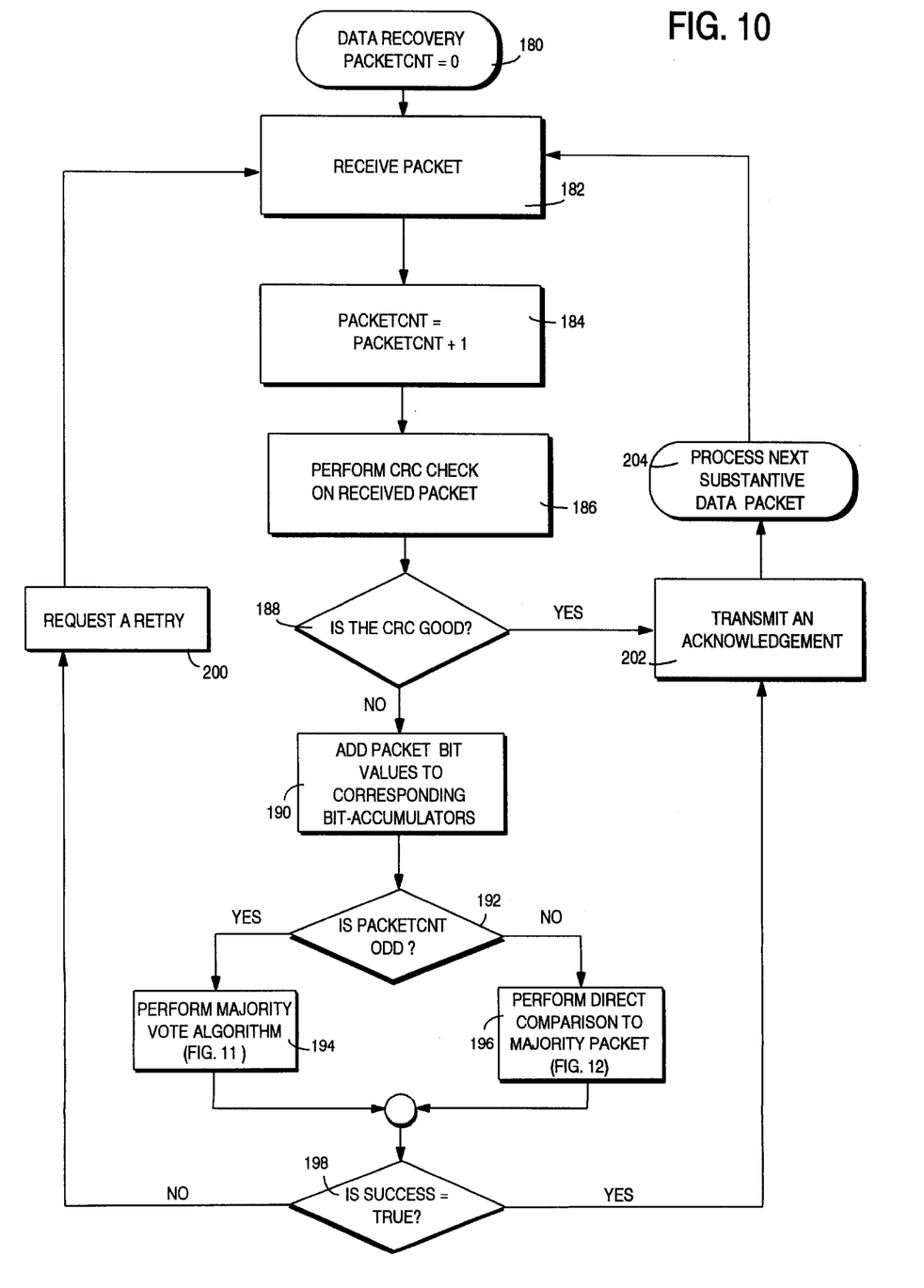
FIG. 10 is a flowchart diagram illustrating a data recovery procedure in accordance with one example embodiment of the present invention.
Figure 11:
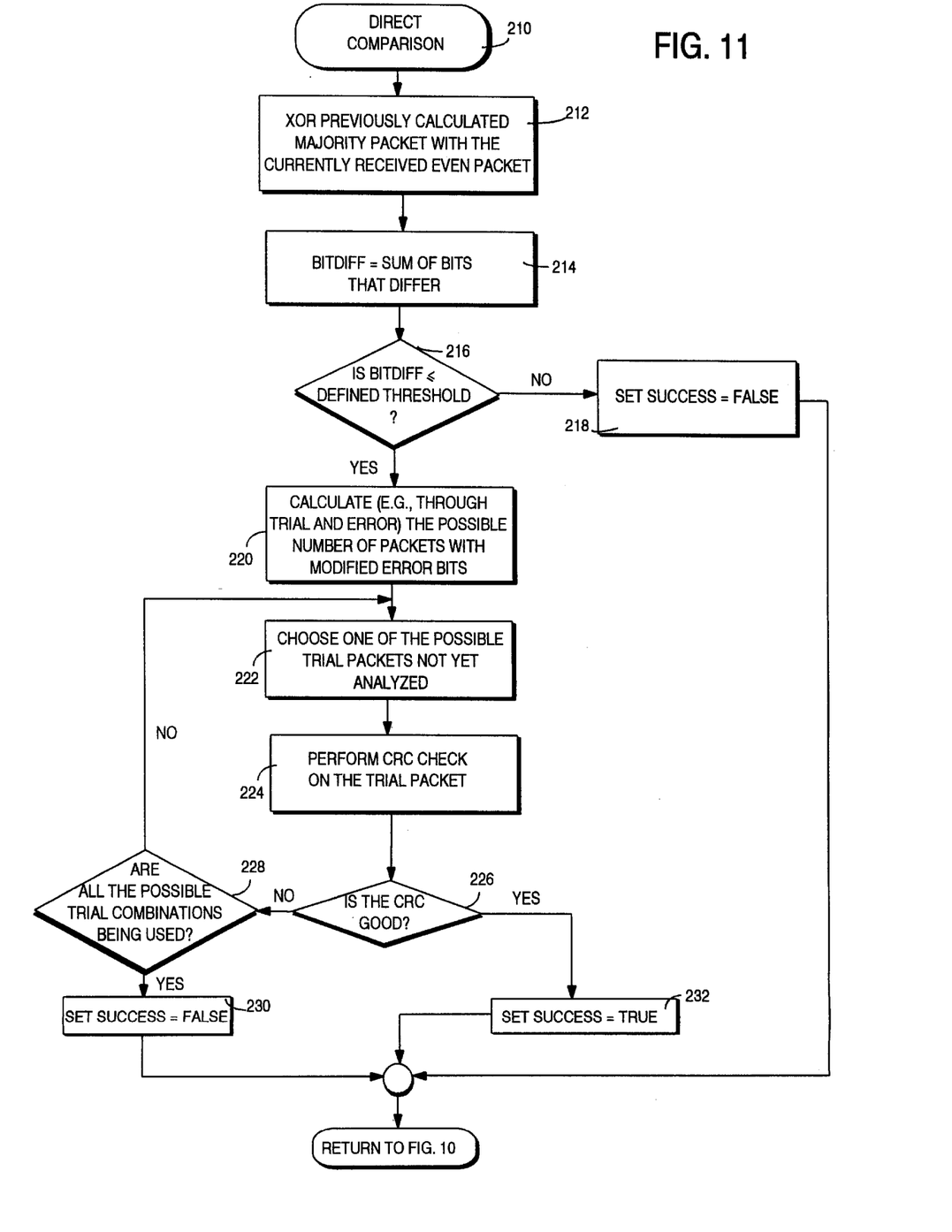
FIG. 11 is a flowchart diagram illustrating a direct comparison operation which may be performed in accordance with one example embodiment of the present invention.
Figure 12:
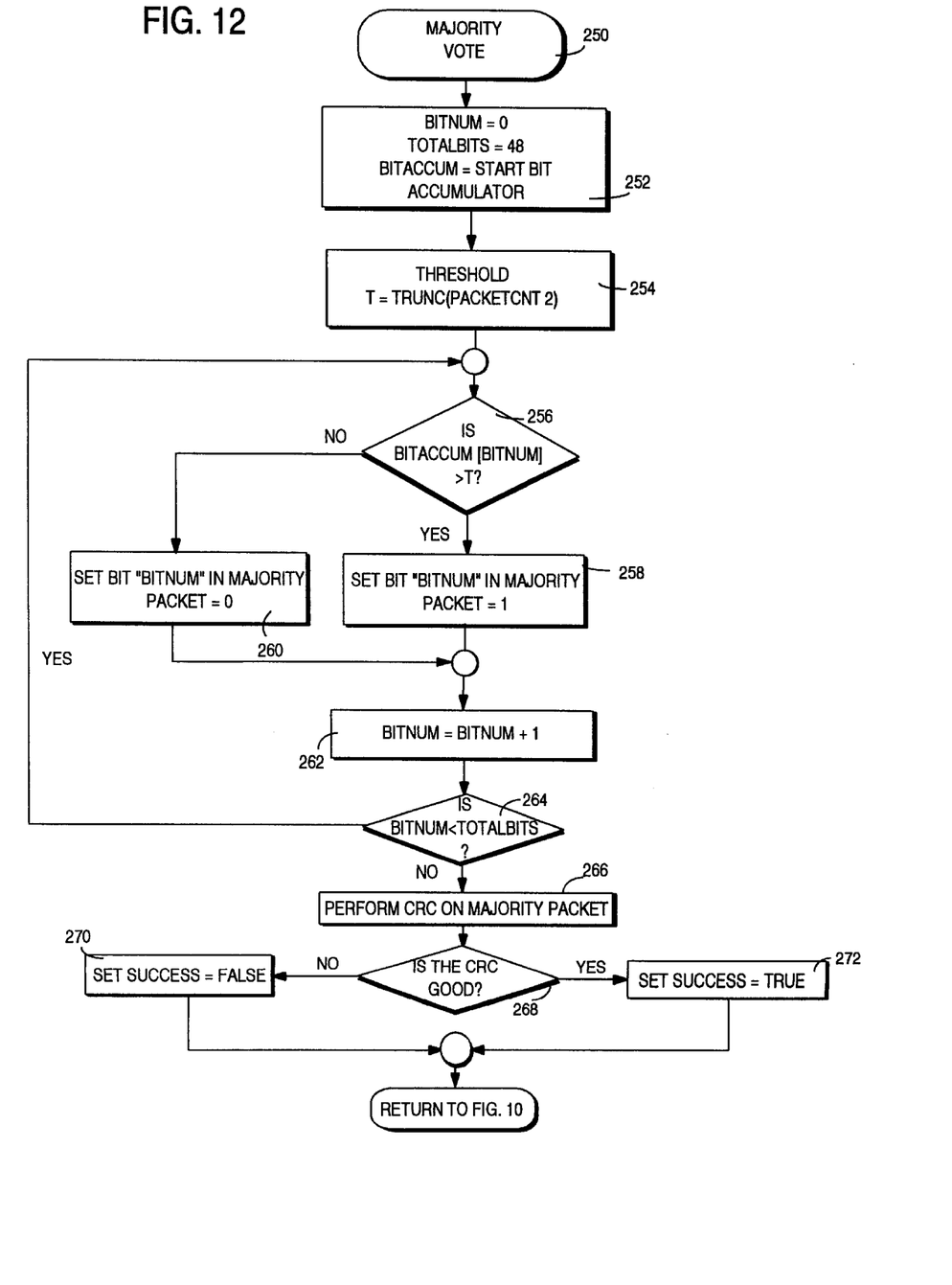
FIG. 12 is a flowchart diagram of a majority voting procedure which may be performed in accordance with one example embodiment of the data recovery scheme in accordance with the present invention.

The present invention will now be described in further detail as it may be implemented for example in the radio communications network described above. In particular, an example data recovery procedure performed by a radio receiver receiving data packets transmitted over a radio channel is now described in conjunction with the flowchart illustrated in FIG. 10. Initially, a packet count variable PACKETCNT is set equal to zero (block 180). A data packet is received (block 182), and the packet count variable is incremented (block 184). Assuming that the data packet has a format similar to that shown in FIGS. 4–6, a CRC check operation is performed on the received packet to detect any errors (block 186). If the CRC check confirms that the data packet was correctly received (block 188), the receiver transmits an acknowledge signal (block 202) over the radio communications channel and control returns to block 182 to receive the next data packet. Otherwise, the received data packet bit values are added to the corresponding bit accumulators maintained for this data packet (block 190). A decision is made in block 192 whether the current packet count is odd, i.e., is this an even or odd re-transmission of this data packet. If it is an odd transmission, a majority vote data unit recovery algorithm illustrated in more detail in FIG. 11 is performed (block 194). If it is an even transmission, the direct comparison data recovery procedure is performed as illustrated in FIG. 12 (block 196). After performing either of the data recovery operations illustrated in more detail in FIGS. 11 and 12, control returns to decision block 198 to determine whether the packet is successfully decoded using the CRC check. If not, a retry is requested in block 200 with control returning to block 182 to receive the retransmitted packet. Otherwise the reconstructed data packet is acceptable, and an acknowledgment signal is transmitted (block 202) with the next substantive data packet being processed in block 204.

The direct comparison algorithm (block 210) is now described in conjunction with the flowchart illustrated in FIG. 11. The majority data packet which was calculated for the odd transmission of the data packet immediately preceding the currently received even transmission of the data packet is exclusive-ORed with the currently received, even data packet (block 212) in a manner similar to that illustrated in FIG. 6. The sum of the number of bits that differ as a result of the exclusive-OR comparison (i.e., those bit positions which have an exclusive-OR output of "1") is assigned to variable BITDIF (block 214). A decision is made if the variable BITDIF is less than or equal to a predefined threshold (block 216). As mentioned above, the threshold is a trade off between improved data recovery performance and the data processing time/resources required to calculate CRCs for the proposed number of bit combinations that result from this number of bit differences. If the number of differing bits exceeds the threshold, a success flag is set to false (block 218). Control returns to FIG. 10, and in a retry request is made so that the data packet is retransmitted. Otherwise, various bit combinations are used to generate a list of possible trial data packets (block 220). One of those possible trial data packets is selected (block 222), and a CRC check calculation is performed (block 224). If the CRC check is satisfactory (block 226), the success flag is set to true (block 232), and control returns to FIG. 10 where an acknowledge signal is transmitted. Otherwise, a decision is made in block 228 whether all possible trial data packet combinations have been analyzed. If not, control returns to block 222 to select another of the possible trial data packets not yet analyzed. Otherwise, all possible trial data packets produced unacceptable results. The success flag is set to false (block 230), and control returns to FIG. 10 to send a negative acknowledgment thereby causing the data packet to be retransmitted.

The majority vote algorithm (block 250) is now be described in conjunction with the flowchart illustrated in FIG. 12. In block 252, a variable TOTALBITS corresponding to the total number of bits in the data packet is set. Following in the non-limiting example used in this description, the total number of bits is set to 48. The bit accumulator is initialized as is a variable BITNUM which "points" to one of the bit positions in the data packet. In block 254, a threshold variable T is set. One example method for calculating the threshold is to divide the packet count by two and truncate ("TRUNC") the remainder.

A decision is made in block 256 whether the bit sum in the bit accumulator for the current bit position being pointed to exceeds the threshold T (block 256). If it does, the bit value of this bit number in the majority data packet is set to one (block 258). If it is not, the bit value for this bit position in the majority data packet is set to zero (block 260). Then in block 262, the variable BITNUM is incremented by one to point to the next bit position/bit accumulator. A decision is made in block 264 whether the new bit position (BITNUM) is less than the total number of bits in the data packet. If so, the procedures in blocks 256–264 are repeated. Otherwise, the majority voting operation is completed for this data packet, and a CRC check is performed in block 266. If the results of the CRC check are good (block 268), the success flag is set to equal to true (block 272); otherwise, the success flag is set to false (block 270). Control is then returned to FIG. 10 to either transmit an acknowledgment (block 202) or request a retry (block 200).

Accordingly, the present invention recovers data utilizing information from previously received data packets to reconstruct a data packet with an ever increasing probability of reconstructing the actually transmitted data packet assuming a bit error rate of less than 50%. With each new reception, the accumulated information brings the receiver closer to obtaining the actually transmitted data packet. This use of information which might otherwise be discarded permits highly efficient and effective bit error correction particularly useful in hostile communications environments by transceivers with limited data processing and/or memory resources.

While the invention has been described with reference to particular embodiments thereof, the scope of the invention as well as its application and features extends to other embodiments and is limited only by the claims that follow.

What is claimed is:

1. A data communications method comprising:

(a) transmitting a data message including plural data packets;

(b) receiving the data message and checking a first data packet included in the received data message for errors;

(c) requesting retransmission of the data packet if an unacceptable error is detected in the first data packet;

(d) receiving the retransmitted data packet as a second data packet;

(e) comparing the bits of the first and second data packets;

(f) changing one or more bits in one of the first and second data packets that do not match with one or more corresponding bits in the other of the first and second data packets;

(g) checking the changed data packet for errors;

(h) repeating steps (f) and (g) if an unacceptable error is detected until all possible bit combinations for the non-matching bits have been tried or until the changed packet is found acceptable; and (i) if the changed data packet is found acceptable in step (g), transmitting an acknowledge signal.

2. The method in claim 1, wherein step (e) includes performing an exclusive-OR operation on the first and second received data packets.

3. The method in claim 1, wherein each data packet includes data bits and error detection bits, and wherein the checking steps (b) and (g) include performing a cyclic redundancy code calculation on the data packet.

4. The method in claim 1, further comprising:

comparing the number of non-matching bits determined in step (e) with a threshold, and executing step (f) when the number of non-matching bits is less than the threshold.

5. A data communications method comprising:

(a) transmitting a data message including plural data packets:

(b) receiving the data message and checking a first data packet included in the received data message for errors;

(c) requesting retransmission of the data packet if an unacceptable error is detected in the first data packet;

(d) receiving the retransmitted data packet as a second data packet;

(e) comparing the bits of the first and second data packets;

(f) changing one or more bits in one of the first and second data packets that do not match with one or more corresponding bits in the other of the first and second data packets;

(g) checking the changed data packet for errors;

(h) repeating steps (f) and (g) if an unacceptable error is detected; and (i) if the changed data packet is found acceptable in step (g), transmitting an acknowledge signal, (j) requesting another retransmission of the data packet;

(k) receiving the another retransmitted data packet as a third data packet;

(l) performing a majority vote of the first, second, and third data packets and generating a majority data packet;

(m) checking the majority data packet for errors; and (n) generating an acknowledge signal if the majority data packet is found acceptable in step (m).

6. The method in claim 5, wherein the majority vote performing step (1) includes the step of maintaining a bit accumulator for each corresponding bit position in the data packet such that each bit accumulator sums the bit value in the corresponding bit position from each of the first, second, and third data packets.

7. A data communications method comprising:

(a) transmitting a data message including plural data packets (b)) receiving the data message and checking a first data packet included in the received data message for errors;

(c) requesting retransmission of the data packet if an unacceptable error is detected in the first data packet;

(d) receiving the retransmitted data packet as a second data packet;

(e) comparing the bits of the first and second data packets;

(f) changing one or more bits in one of the first and second data packets that do not match with one or more corresponding bits in the other of the first and second data packets;

(g) checking the changed data packet for errors;

(h) repeating steps (f) and (g) if an unacceptable error is detected; and (i) if the changed data packet is found acceptable in step (g), transmitting an acknowledge signal, wherein each data packet includes data bits and error detection bits but not error correction bits.

8. A data processing method, comprising the steps of:

receiving a sequence of data units including a first transmitted data unit and one or more retransmitted data units;

reconstructing a data unit using the sequence of data units including:

for alternating data units in the sequence, performing a majority vote operation using information from data units received earlier in the sequence and a currently received data unit to generate a majority voted data unit, the majority voted data unit being the reconstructed data unit for the alternating data units, and for data units in the sequence other than the alternating data units, comparing the majority voted data unit and a currently received data unit to identify one or more bit positions having different bit values and changing one or more of those bit values, the data unit with the one or more changed bit values being the reconstructed data unit for the other data units; and determining whether each of the reconstructed data units is acceptable.

9. The method in claim 8, wherein the alternating data units are odd data units in the sequence and the other data units are even data units in the sequence.

10. The method in claim 8, wherein the comparing step includes performing an exclusive-OR operation, comparing the number of different bit values with a threshold, and performing the changing step when the number of different bit values is less than the threshold.

11. The method in claim 8, wherein the majority voted data unit is determined in accordance with the following steps:

accumulating for each corresponding bit position in the data unit a sum of the bit values in the corresponding bit position from each data unit in the sequence;

determining a threshold based on the number of data units in the sequence;

comparing each accumulated sum to the threshold;

if the accumulated sum is less than or equal to the threshold, setting the bit value for the corresponding bit position of the majority voted data unit to 0; and if the accumulated sum is greater than the threshold, setting the bit value for the corresponding bit position of the majority voted data unit to 1.

12. The method in claim 8, wherein the determining step includes analyzing each of the data units for an error, each data unit including error detection bits, and requesting retransmission of the data unit if an unacceptable error is detected.

13. The method in claim 10, wherein the error detection bits are cyclic redundancy code check bits and each data unit does not include error correction bits.

14. In an automatic repeat request (ARQ) data transaction system where transmitted data units are received, checked for errors, and retransmitted if errors are detected thereby generating a sequence of data units, a method for processing data wherein a first data unit reconstruction operation is performed on alternate data units in the sequence and a second data unit reconstruction operation is performed on the other data units in the sequence to reconstruct an acceptable data unit.

15. The method in claim 14, wherein one of the first and second reconstruction operations includes determining a majority voted data unit based on a currently received data unit and previously received data units in the sequence.

16. The method in claim 15, further comprising:

(a) accumulating for one or more corresponding bit positions in the reconstructed data unit a sum of the bit values for the corresponding bit position from each of the data units in the sequence;

(b) determining a threshold based on the number of data units in the sequence;

(c) comparing each accumulated sum to the threshold;

(d) if the accumulated sum is less than or equal to the threshold, setting the bit value for the corresponding bit position of the reconstructed data unit to 0; and (e) if the accumulated sum is greater than the threshold, setting the bit value for the corresponding bit position of the reconstructed data unit to 1.

17. The method in claim 16, wherein the threshold determining step includes:

dividing the number of data units in the sequence by two, and truncating the resulting quotient.

18. The method in claim 16, wherein steps (a)–(e) are performed for each bit position in the reconstructed data unit.

19. The method in claim 16, wherein steps (a)–(e) are performed for only a portion of bit positions in the reconstructed data unit.

20. The method in claim 14, wherein the majority voted data unit is determined in accordance with the following steps:

accumulating for each corresponding bit position in the data unit a sum of the bit values in the corresponding bit position from each of the current and previously received data units in the sequence;

determining a threshold based on the number of data units in the sequence;

comparing each accumulated sum to the threshold;

if the accumulated sum is less than or equal to the threshold, setting the bit value for the corresponding bit position of the majority voted data unit to 0; and if the accumulated sum is greater than the threshold, setting the bit value for the corresponding bit position of the majority voted data unit to 1.

21. The method in claim 14, wherein the one of the first and second reconstruction operations includes:

comparing the currently received data unit with a data unit based on one or more data units previously received;

identifying the number of bit positions having different bit values; and changing one or more of the different bit values to generate a new data unit.

22. The method in claim 21, further comprising:

determining if the new data unit is acceptable, and if not, repeating the changing step a different one of the different bit values.

23. The method in claim 14, wherein the first data unit reconstruction operation is a majority vote operation performed on data units in the sequence and the second data reconstruction operation is a comparison operation comparing a currently received data unit with a data unit based on one or more data units previously received.

24. A data communications system comprising:

a sender for transmitting a data unit plural times over a data communications link thereby generating a sequence of data units, and a receiver including a data processor and a transceiver connected to the data communications link for receiving the sequence of data units, wherein the data processor (1) reconstructs a data unit for
  (a) alternating data units received in the sequence by performing a majority vote operation using information from data units received earlier in the sequence and a currently received data unit to generate a majority voted data unit, the majority voted data unit being the reconstructed data unit for the alternating data units, and
  (b) for data units received in the sequence other than the alternating data units, by comparing the majority voted data unit and a currently received data unit to identify a number of bit positions having different bit values and changing one or more of those bit values, the data unit with the one or more changed bit values being the reconstructed data unit for the other data units, and (2) determines whether the reconstructed data unit is acceptable.

25. The system in claim 24, wherein the receiver is a portable radio unit and the data communications link is a wireless radio channel.

26. An automatic repeat request (ARQ) radio communications system where transmitted data units are received, checked for errors, and retransmitted if errors are detected such that a sequence of data units is generated, comprising:

a sending radio for transmitting a sequence of data units over a radio communications channel, and a receiving radio including a data processor and a transceiver for receiving the sequence of data units, wherein the data processor performs a first reconstruction operation on alternate data units in the sequence and a second reconstruction operation on the other data units in the sequence to reconstruct an acceptable data unit.

27. The system in claim 26, wherein the first data unit reconstruction operation is a majority vote operation performed on the sequence of data units and the second data reconstruction operation is a comparison operation comparing a currently received data unit with a data unit based on one or more data units previously received.

28. The system in claim 26, wherein the first data unit reconstruction operation is a majority vote operation performed on the sequence of data units, the data processor maintaining a bit accumulator for one or more bit positions in the reconstructed data unit for storing a sum of the bit values for the corresponding bit position from each of the data units in the sequence.

29. The system in claim 28, wherein the data processor determines a threshold based on the number of data units in the sequence, compares each accumulated sum to the threshold, and if the accumulated sum is less than or equal to the threshold, sets the bit value for the corresponding bit position of the majority voted data unit to 0, and if the accumulated sum is greater than the threshold, sets the bit value for the corresponding bit position of the majority voted data unit to 1.

30. The system in claim 26, wherein in performing the second reconstruction operation, the data processor compares the currently received data unit with a data unit based on one or more data units previously received, identifies the number of bit positions having different bit values, and changes one or more of the different bit values to generate a new data unit.

31. The system in claim 30, wherein the data processor determines if the new data unit is acceptable, and if not, makes another change to the different bit values.

* * * * *